United States Patent [19]

Hoblingre et al.

[11] Patent Number: 5,088,767
[45] Date of Patent: Feb. 18, 1992

[54] DEVICE FOR SECURING A TUBULAR MEMBER, IN PARTICULAR A MOTOR VEHICLE STEERING COLUMN

[75] Inventors: André Hoblingre, Valentigney; Patrick Courvoisier, Montbeliard; Jean-Marie Bertrand, Valentigney, all of France

[73] Assignee: ECIA, France

[21] Appl. No.: 605,333

[22] Filed: Oct. 30, 1990

[30] Foreign Application Priority Data

Nov. 9, 1989 [FR] France .................. 89 14708

[51] Int. Cl.⁵ ............................................ B62D 1/18
[52] U.S. Cl. .................................... 280/775; 74/493
[58] Field of Search ..................... 280/775; 74/493

[56] References Cited

U.S. PATENT DOCUMENTS

| | | | |
|---|---|---|---|
| 3,803,939 | 4/1974 | Schenten | 280/775 |
| 3,977,692 | 8/1976 | Findley et al. | 280/775 |
| 4,363,499 | 12/1982 | Watanabe et al. | 280/775 |
| 4,541,298 | 9/1985 | Strutt | 280/775 |

FOREIGN PATENT DOCUMENTS

| | | |
|---|---|---|
| 1523214 | 4/1968 | France . |
| 2360454 | 3/1978 | France . |
| 2491024 | 4/1983 | France . |

*Primary Examiner*—Kenneth R. Rice
*Attorney, Agent, or Firm*—Sughrue, Mion, Zinn, Macpeak & Seas

[57] ABSTRACT

The tubular member (1) is integral with an assembly member (14) capable of sliding in a fixed U-shaped fitting and traversed by a tie bolt (20) guided in curved slots of the fitting. The tie bolt comprises a conical head (42) facing the conical surface (25) of a washer (24) for bearing against the fitting. Spacer balls (52), guided radially on these facing surfaces, the accommodated in inclined slots of a disc integrally connected to the control lever and displaced by the rotation of the latter about the tie bolt (20).

9 Claims, 6 Drawing Sheets

DEVICE FOR SECURING A TUBULAR MEMBER, IN PARTICULAR A MOTOR VEHICLE STEERING COLUMN

BACKGROUND OF THE INVENTION

The present invention relates to a device for securing a tubular member, in particular a motor vehicle steering column, which can be adjusted by pivoting and/or by axial displacement.

Increasing importance is being attached to a driver of a motor vehicle being able to adjust the position of the steering wheel, this contributing not only to the comfort of the driver but also to the ease of handling of the vehicle. Consequently, the steering column which supports the steering wheel is mounted pivotably on a preferably horizontal fixed shaft and/or is made in several elements capable of being displaced telescopically relative to one another. It is furthermore supported at an intermediate point by a securing device which comprises a fitting, fixed onto the bodywork and forming an inverted-U-shaped structure in which the column can be displaced, an assembly member integral with the column and in contact by opposite faces with the side walls of the U of the fitting, and means for locking by bringing the side walls of the fitting closer together, comprising a tie bolt which traverses, parallel to the pivot axis, the side faces of the fitting in curved slots between two outer bearing stops.

Various types of clamping means have been proposed and used hitherto in order to act on the side walls of the fitting via the tie bolt. In certain cases, they are very simple in construction; they comprise, for example, a nut screwed onto a screw thread of the end of the tie bolt, but their efficiency is unreliable since the action exerted on the nut can vary from one driver to another.

Other more complex devices make use of cams or toggle-joint systems driven by a control lever which can move in a plane perpendicular to the axis of the steering column. The clamping is more accurate but these devices are subject to wear and to damage under the influence, in particular, of external attack such as corrosion, impacts etc., with the result that it is necessary to check them and adjust them frequently. Furthermore, the control lever is often an inconvenience to the driver.

SUMMARY OF THE INVENTION

The object of the present invention is to overcome these disadvantages by providing a securing device which enables precise and stable locked and released positions to be obtained with clamping means which are compact and are effectively protected against external attack.

Indeed, the subject of this invention is a securing device of the abovementioned type in which the clamping means comprise, between a widened head of the tie bolt and the corresponding bearing stop whose facing surfaces define a space with a substantially V-shaped cross-section, at least one spacer member displaced radially by the rotation of a control lever about the axis of the tie bolt.

According to one embodiment, spacer balls are retained by radial rolling tracks of the bearing stop and/or of the head of the tie bolt and are accommodated in inclined slots of a disc which is free in rotation about the tie bolt and integrally connected to the control lever.

The disc and the spacer members are preferably accommodated inside a casing formed in the control lever itself.

The rotation of the control lever and consequently of the slots containing the balls about the axis of the tie bolt causes a radial displacement of the balls between a position close to the tie bolt, which corresponds to the clamping of the tubular member, and an outer released position.

The advantages and features of the invention will, moreover, become apparent from the description hereinbelow of an embodiment, given by way of nonlimiting example and shown in the attached drawings, in which:

DESCRIPTION OF PREFERRED EMBODIMENTS

Figure 1:
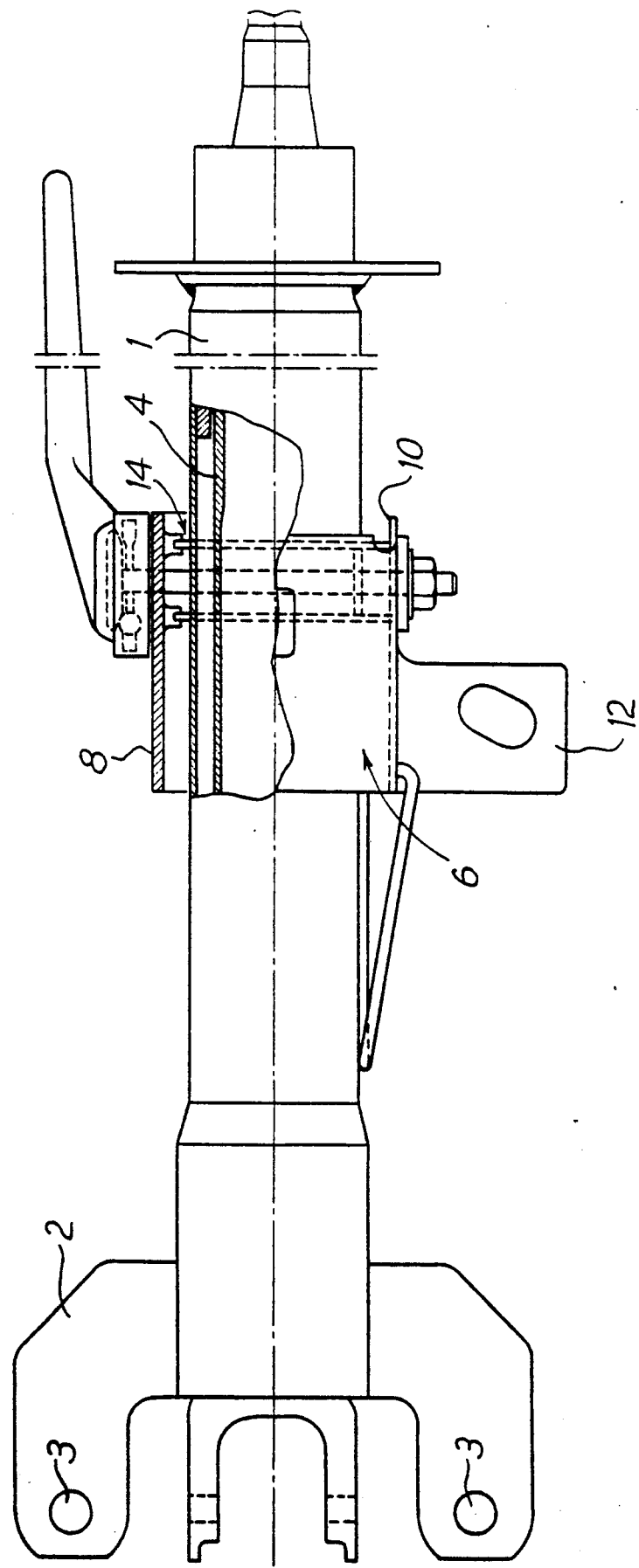
FIG. 1 is a top view, with partial cutaway, of a steering column which can be adjusted by pivoting and is provided with a securing device according to the invention.
Figure 2:
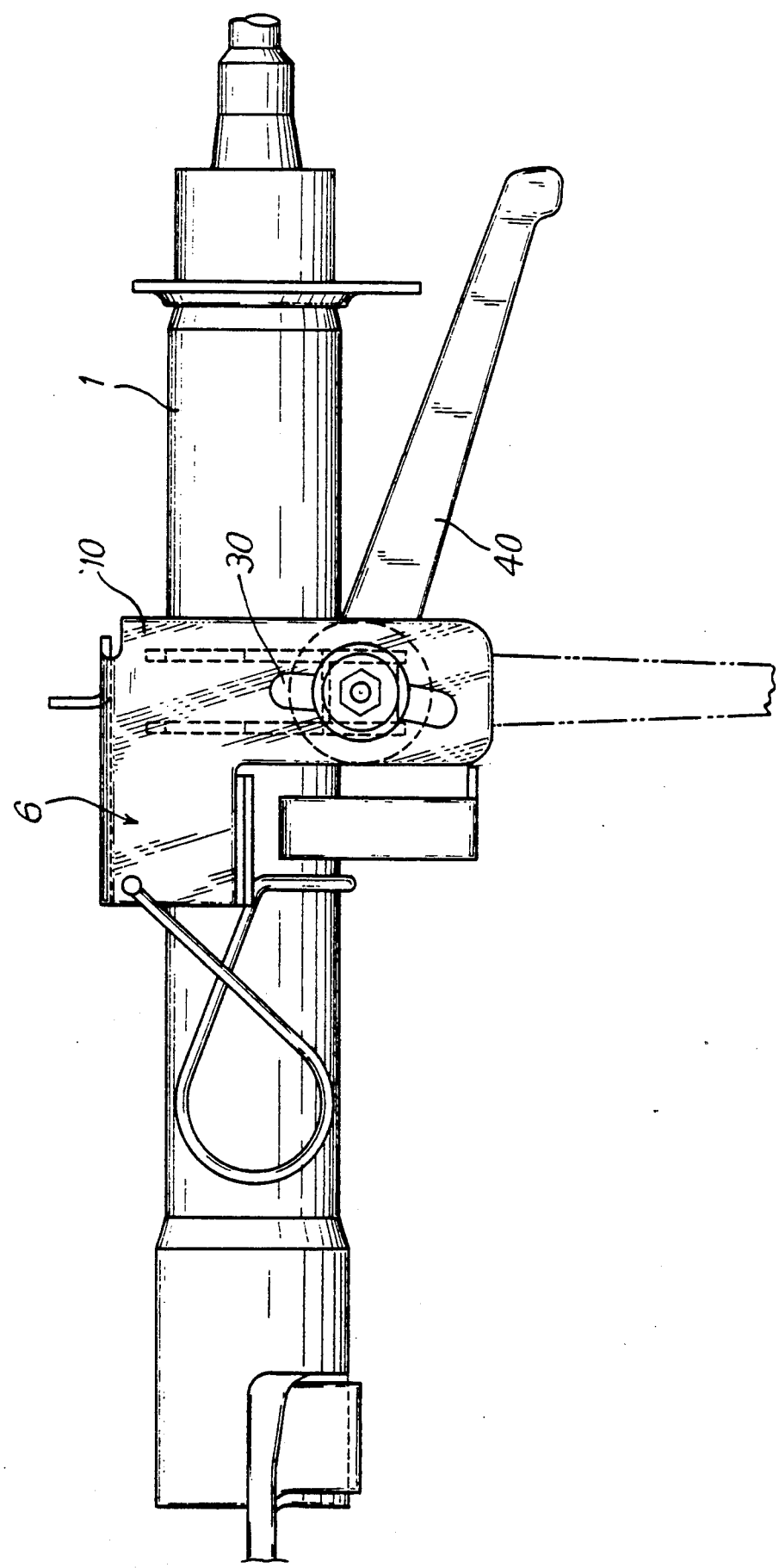
FIG. 2 is a side view of the column in FIG. 1.

The examplary embodiment shown in the attached drawings relates to the securing of a motor vehicle steering column, but it will be clearly apparent to a person skilled in the art that this is given purely by way of an indicating example and that the securing device which is the subject of the invention may also be used for other types of tubular members which can be adjusted by pivoting and/or by axial displacement.

The steering column shown in FIGS. 1 to 4 comprises a cover tube 1 which is integral, in its lower part (FIGS. 1 and 2), with two lugs 2, pierced with holes 3, enabling it to be fixed to the bodywork of the vehicle, and to pivot about a shaft, preferably horizontal, connecting the holes 3 of the two lugs 2. This shaft (not shown) coincides with the axis of articulation of the lower end of a steering shaft 4 mounted so as to rotate in the cover tube 1 and carrying, at its upper end, a steering wheel (not shown). The position of this steering wheel may thus be modified by pivoting the whole steering column about the axis 3—3.

The steering column is also fixed to the bodywork of the vehicle via a fitting 6 forming an inverted-U-shaped structure whose two side walls, 8 and 10 respectively, hang down on either side of the column 1 and are provided with horizontal flanges 12 for fixing to the bodywork.

Figure 3:
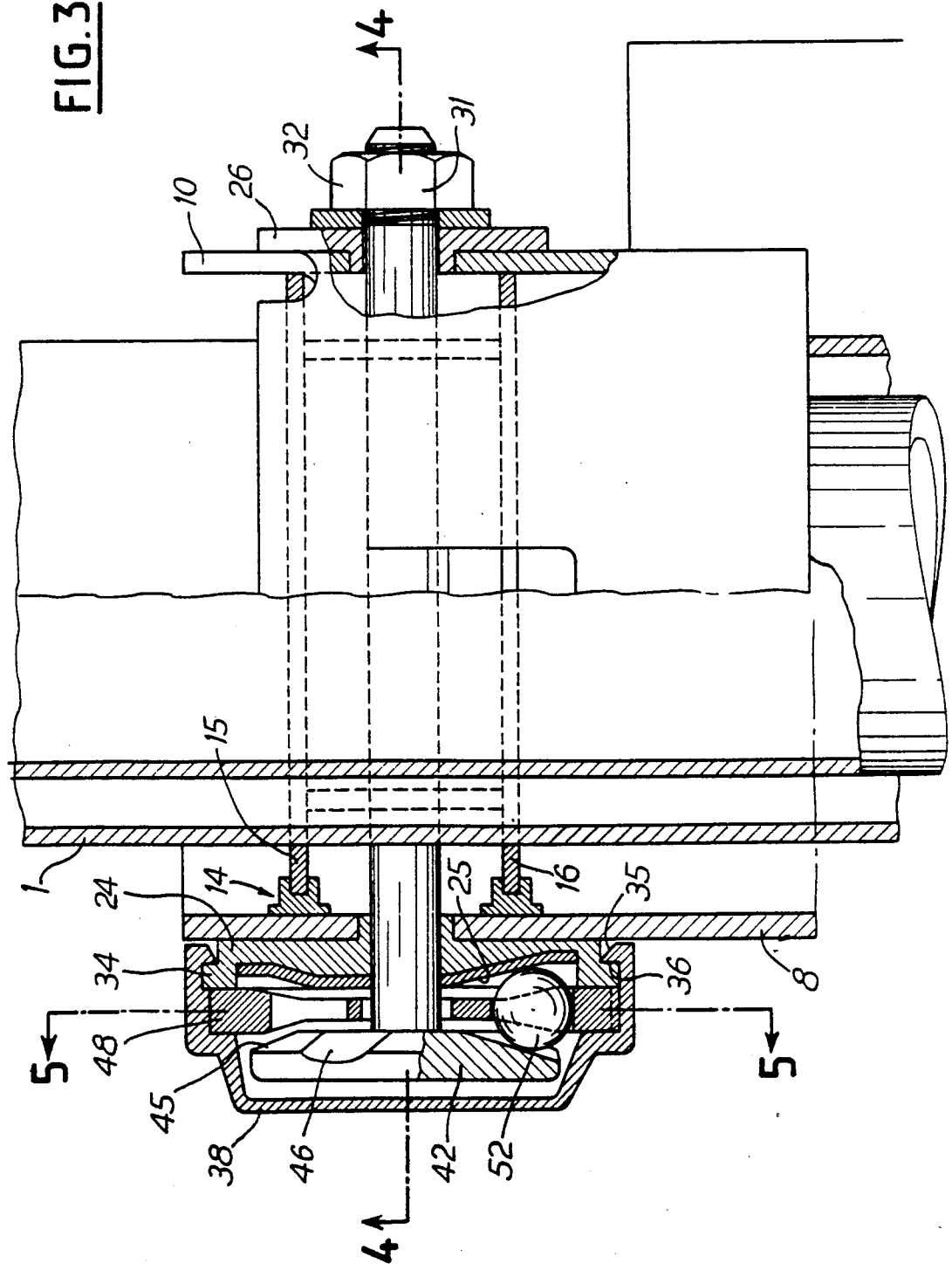
FIG. 3 is a view on a larger scale, partly in top view with partial cutaway, partly in cross-section, of the securing device mounted on the column, in the released position.
Figure 4:
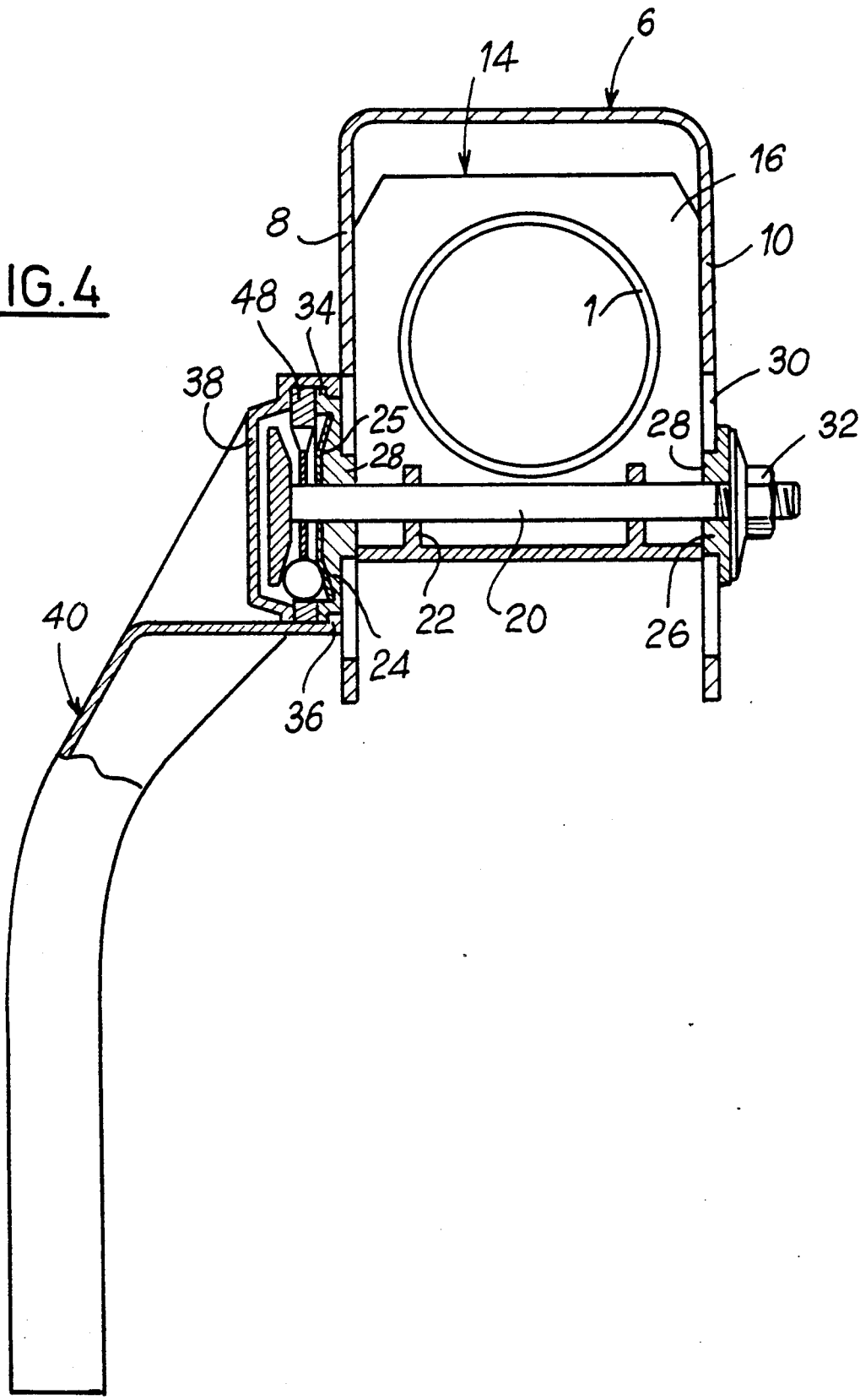
FIG. 4 is a view in cross-section along the line 4—4 in FIG. 3.

Inside the fitting 6, the column 1 is integral with an assembly member 14 in contact with the inner faces of the side walls 8 and 10 of the fitting and, in the absence of any clamping, are capable of sliding along these walls when the column 1 pivots. In the embodiment shown, the assembly member 14 has a U-shaped cross-section and comprises two flat parallel flanks, 15 and 16 respectively, each pierced with a central orifice and fixed, for example by welding the edge of this orifice, to the cover tube 1 (FIGS. 3 and 4).

The side walls 8 and 10 of the fitting 6 are held in contact with the assembly member 14 by means of a tie bolt 20 which traverses these two walls and guide lugs 22 of the assembly member (FIG. 4) and carries two washers, 24 and 26 respectively, which have a plane face for bearing against the corresponding wall 8, 10, which face is equipped with an elongated central stud 28 penetrating into a curved slot 30 of the corresponding wall 8, 10.

The contact of the stud with the walls of the slot 30 prevents the washer 24, 26 from rotating on itself whilst at the same time ensuring the guidance of its pivoting about the axis 3.3. Moreover, the stud 28 is pierced with a central hole with a polygonal shape, for example a square, which matches the shape of the tie bolt and ensures that the latter is integral in rotation and in pivoting with the washer but does not permit their relative axial sliding.

One of the ends 31 of the tie bolt 20 is threaded and carries a nut 32 which bears against the washer 26 and adjusts its position on the tie bolt 20. At the opposite end, the washer 24 comprises a peripheral shoulder 34 which defines, with the side wall 8, a groove 35. An annular rim 36, formed on the periphery of the opening of a casing 38 constituting the end of a control lever 40, fits into this groove. The dimension of the groove 35 and of the rim 36 are such that the latter, and indeed the casing 38 and the lever 40 can rotate freely about the bearing washer 24, in other words about the axis of the tie bolt 20.

Inside the casing 38, the washer 24 has a substantially frustoconical surface 25, whereas the tie bolt 20 ends in a widened head 42 which likewise has, facing the washer 24, a frustoconical surface 45. The facing surfaces 25 and 45 thus define between them a space with a substantially V-shaped cross-section which widens towards the outside.

Figure 7:
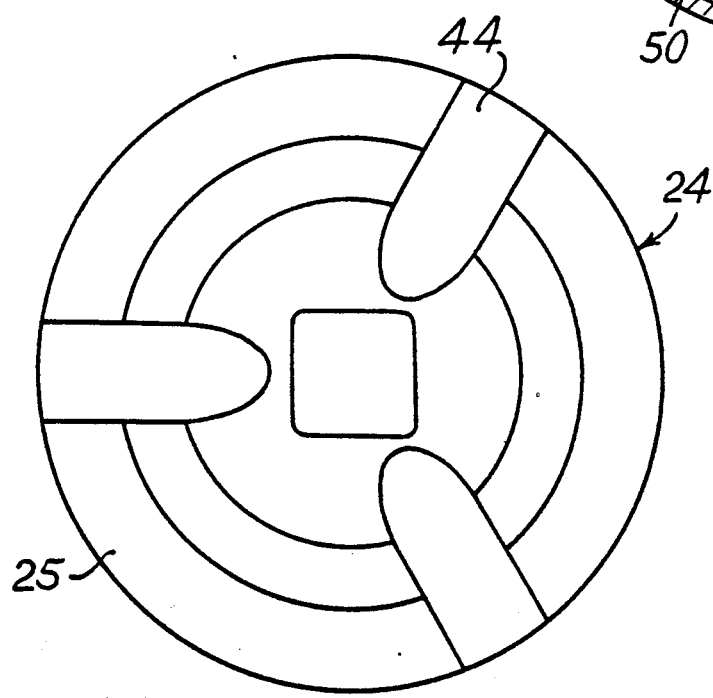
FIG. 7 is a front view of the bearing stop provided with rolling tracks.

At least one radial rolling track, or ramp 44, with an arc-shaped cross-section, and preferably several ramps, three in the embodiment shown, is arranged in the frustoconical surface 25 of the washer 24. As is shown more particularly in FIG. 7, each of the rolling tracks 44 extends from the vicinity of the centre of the washer 24 to a peripheral rim forming the shoulder 34. The frustoconical surface 45 of the head 42 of the tie bolt 20 preferably has the same number of rolling tracks or ramps 46, which, similarly, extend radially with a constant depth.

A disc 48 integrally connected to the casing 38, which is perpendicular to the tie bolt 20 and free in rotation relative to the latter, is mounted between these two frustoconical surfaces. The disc 48 has, for example, a central circular orifice 54 with a diameter slightly greater than the diagonal of the cross-section of the tie bolt. This disc 48 has at least one slot 50 (FIGS. 5 and 6) inclined relative to its radius such that the slot has one end 51 close to the central orifice 54, whereas its other opposite end 53 is substantially equidistant from this orifice and the periphery of the disc. In fact, each of the slots 50 has a substantially rectilinear central portion and is slightly curved at its ends. A ball 52 is accommodated in each of the slots 50 and projects from either side of this slot in order to come into contact with the facing rolling track of the head 42 and/or of the stop washer 24. The disc 48 preferably has a central portion which is thinner in the vicinity of the tie bolt 20, in the narrow part of the V-shaped space.

Figure 5:
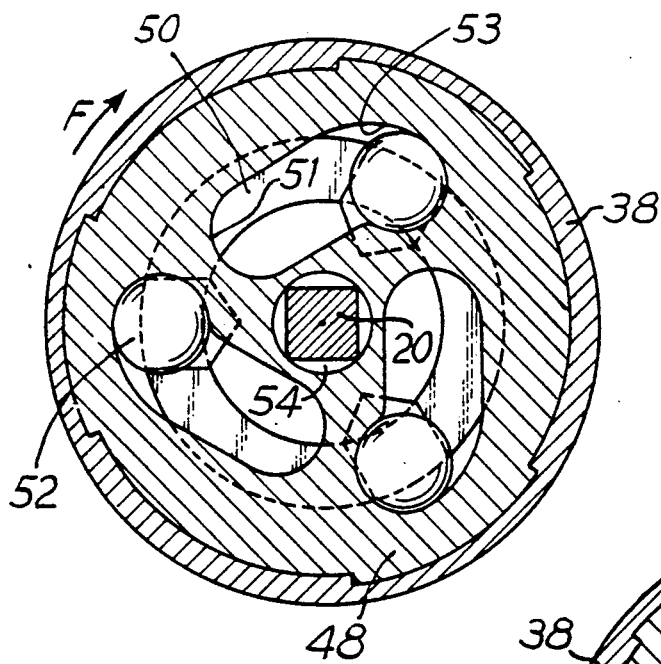
FIG. 5 is a view in cross-section along the line 5—5 in FIG. 3.

When the securing device is in the released position shown in FIGS. 3 and 5, the balls 52 are thus in their outermost position. Indeed, each ball 52 is simultaneously accommodated at the end 53 of the slot 50 furthest from the tie bolt 20 and from the central orifice 54, and in simple contact with portions of the rolling tracks 44 and 46 relatively far apart from one another. The head 42 is spaced apart from the base of the casing 38 and the stop washers 24 and 26 are in sliding contact with the walls 8 and 10.

The whole column can pivot, driving the member 14 and the tie bolt 20. The studs 28 guide this displacement. The control lever 40 is preferably substantially perpendicular to the tube 1 and points downwards.

When the desired position has been reached, displacement of the lever 40 towards the tube 1, in other words pivoting of this lever in a clockwise direction, as indicated by the arrow F in FIG. 5, activates the locking. Indeed, this lever causes the disc 48 to rotate about the tie bolt 20 such that the outer edge of each of the slots 50 progressively pushes the corresponding ball 52 towards this tie bolt, while the radial rolling track or tracks 44 and/or 46, which are fixed in rotation, limit this displacement to a radial travel. Each ball is therefore pushed towards the facing tops of the conical surfaces 25, 45 and consequently tends to separate them from one another, in other words to push the washer 26 towards the wall 8, and the head 42 towards the base of the casing 38. It therefore causes the tie bolt 20 to slide axially and to be tensioned, which drives the nut 32 and obliges it to clamp the washer 26 against the wall 10. The walls 8 and 10 of the fitting 6 are then deformed by being brought closer to one another until the member 14 is locked between them.

The lever reaches its active position, substantially parallel to the column, when the ball 52 is accommodated in the end 51 of the slot 50, in a slightly curved portion which ensures its stable locking in position and prevents any accidental displacement.

Figure 6:
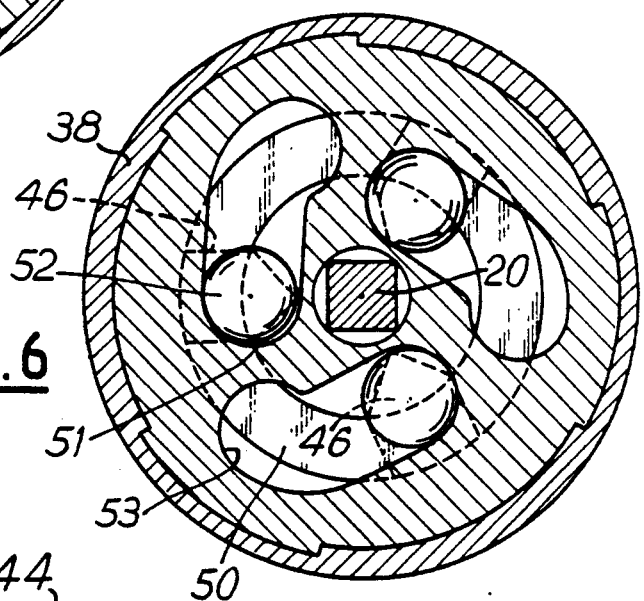
FIG. 6 is a view similar to FIG. 5 showing the spacer members in the clamping position.

Further adjustment can, however, take place at any time. The control lever 40 need only be tilted downwards, from the position shown in FIG. 1 to that in FIG. 4. The cam disc 48 then rotates in an anticlockwise direction, if FIGS. 5 and 6 are considered, with the result that the inner edge of each slot 50 causes the ball 52 to leave the end 51 and then moves it away from the tie bolt 20, guided by the rolling tracks. Each ball effects a radial travel towards the outside and gradually frees the tie bolt 20 and the washers 24 and 26 which are released from bearing against the fitting 6. When all the balls have reached the curved end position 53 of the slot 50, the member 14 and the tube 4 can pivot.

This released position is clearly determined and, like the clamped position, can easily be felt by the driver. It is, furthermore, a stable position simply by virtue of the shape of the slot 50, with the result that the functioning of the securing device is very precise and safe. Furthermore, the protection assured by the casing 38, which shelters all the active members of the device, makes this safety extremely reliable, preventing external risks of attack. It moreover enables the size of the unit to be reduced, the clamping means being mounted actually inside the control lever.

The assembly member 14 can, of course, have various shapes without there being any need to modify the securing device. It can, in particular, be realized so as to enable the assembly of an axially adjustable, telescopic tubular member, and even of a member capable of being adjusted both axially and by pivoting.

Figure 8:
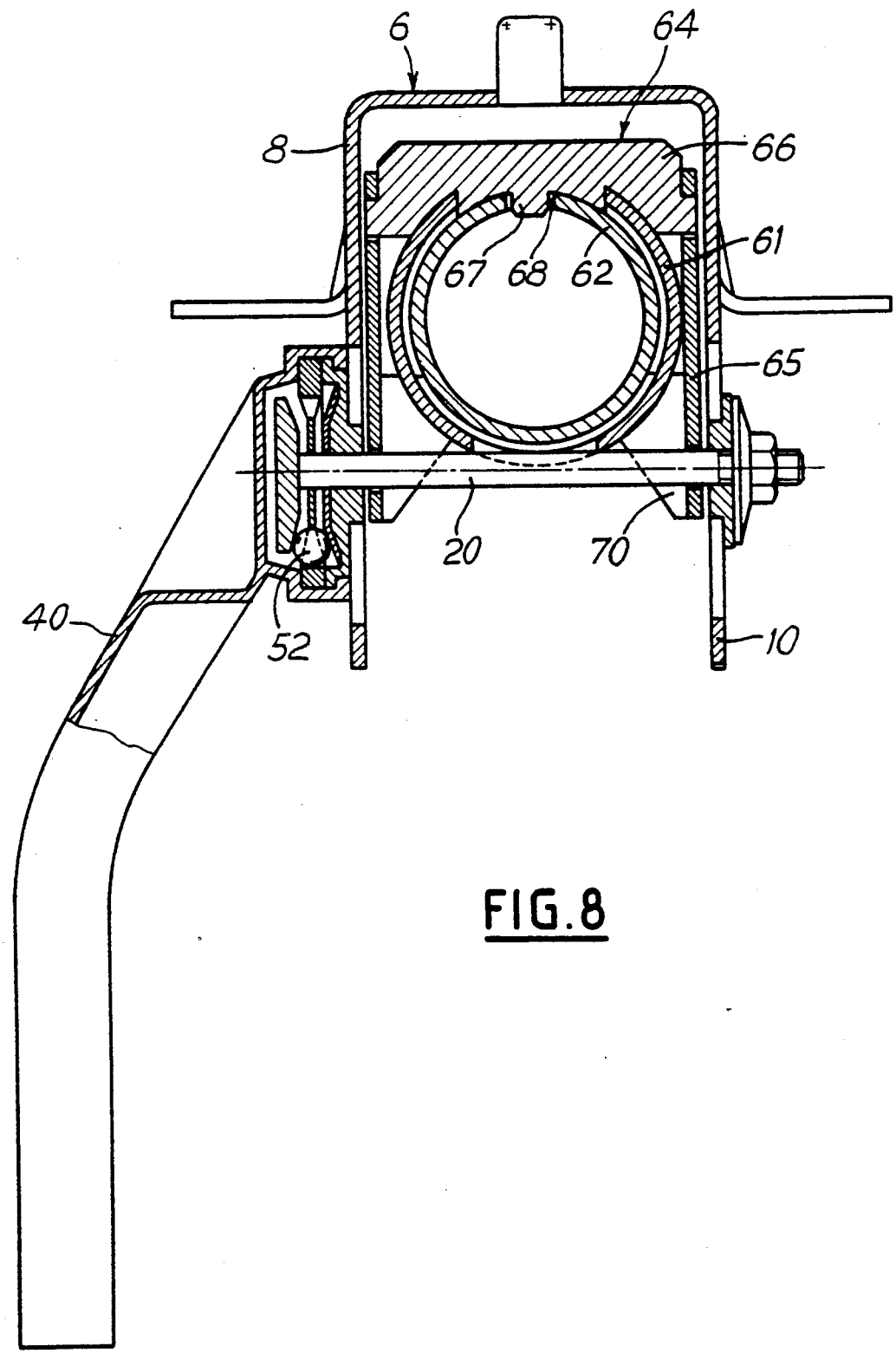
FIG. 8 is a view similar to FIG. 4 of a device for securing a telescopic column.

FIG. 8 illustrates an embodiment in which a tubular member, for example a telescopic steering column whose cover tube comprises an outer tube 61 in which an inner tube 62 slides, is mounted in the fitting 6 via an assembly member 64. This member 64 comprises two plates 65 which are each parallel to one of the side walls 8, 10 of the fitting 6 and are interconnected, at their upper part, by a cross-brace 66. The cross-brace 66 is also fixed to the outer tube 61 and is extended by a keying finger 67 guided in a longitudinal slot 68 of the inner tube 62.

Opposite the cross-brace 66, each plate 65 carries two flanges 70 which are perpendicular to it and traverse slots of the outer tube in order to bear against the inner tube when the unit is clamped. Between their flanges 70, the plates 65 are each pierced with a hole for the passage of the tie bolt 20 of the above-described locking device.

Consequently, when the balls 52 are, as shown, in their outer release position, the column 61, 62 is free. The sliding tube 62 can be displaced relative to the outer tube and/or the whole column can pivot and the assembly member 64 slide along the walls of the fitting 6. When the desired adjustment has been made, operation of the control lever 40 causes the cam washer 48 to rotate and, bringing the walls 8 and 10 closer to the plates 65, clamps the flanges 70 onto the inner tube and thus immobilizes the two tubes.

Other forms of assembly member and/or fitting can, of course, also be used between the locking device of the invention and the tubular member to be secured.

What is claimed is:

1. A securing device for securing a tubular member, and in particular a motor vehicle steering column, which can be adjusted continuously by pivoting and/or by axial displacement, said device comprising: a fitting (6) fixed onto bodywork of the vehicle and forming an inverted-U-shaped structure in which the tubular member can be displaced; an assembly member (14) which is integral with the tubular member and which has two opposite faces (15, 16) in contact with side walls (8, 10) of the fitting; and locking means, for locking the tubular member by bringing the side walls (8, 10) of the fitting (6) closer together; said locking means comprising:

a longitudinally-extending tie bolt (20) which traverses, parallel to a pivot axis of the tubular member, the side walls (8, 10) of the fitting (6) in curved slots (30) of the side walls (8, 10), between two outer bearing stops (24, 26) carried by the tie bolt;
a control lever (40); and
at least one spacer member (52);
wherein facing surfaces of a widened head (42) of the tie bolt (20) and of a corresponding one of said bearing stops (24) define a space with a substantially V-shaped cross-section; and
wherein said one spacer member (52) is disposed in said space and is displaceable radially by rotation of the control lever (40) about the longitudinal axis of the tie bolt (20).

2. Securing device according to claim 1, characterized in that there are a plurality of spacer members, and in that each spacer member (52) is driven by a disc (48) integrally connected to the control lever (40) and retained by a radial rolling track (44, 46) arranged in one of said facing surfaces of the space with a V-shaped cross-section.

3. Securing device according to claim 2, characterized in that each spacer member (52) is retained by a rolling track (46) arranged in the head (42) of the tie bolt (20).

4. Securing device according to claims 2 or 3, characterized in that each spacer member (52) is retained by a rolling track (44) arranged in the bearing washer (24).

5. Securing device according to claims 2 or 3, characterized in that the disc (48) has a slot (50) inclined relative to its radius for receiving each of the spacer members (52).

6. Securing device according to claim 5, characterized in that each slot (50) comprises a substantially rectilinear central part and at least one curved end portion (51, 53) which ensures stable locking.

7. Securing device according to claim 1, characterized in that the head (42) of the tie bolt (20) and the bearing corresponding stop (24) have, facing one another, frustoconical surfaces in which are arranged radial ramps (44, 46) having an arc-shaped cross-section.

8. Securing device according to claim 1, characterized in that each bearing stop comprises a washer (24, 26), capable of sliding axially on the tie bolt (20), and is provided with a stud (28) penetrating into a corresponding one of the curved slots (30) of the fitting (6).

9. Securing device according to claim 1, characterized in that an end of the tie bolt (20) opposite the head (42) is threaded and carries a tension-adjusting nut (32) bearing against the other bearing stop (26).

* * * * *